United States Patent
Iwasa (10) Patent No.: US 9,703,304 B2
(45) Date of Patent: Jul. 11, 2017

(54) VOLTAGE BOOSTER CIRCUIT, SEMICONDUCTOR DEVICE, AND VOLTAGE BOOSTER CIRCUIT CONTROL METHOD

(71) Applicant: LAPIS SEMICONDUCTOR CO., LTD., Kanagawa (JP)

(72) Inventor: Yosuke Iwasa, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 121 days.

(21) Appl. No.: 14/665,347

(22) Filed: Mar. 23, 2015

(65) Prior Publication Data
US 2015/0277459 A1 Oct. 1, 2015

(30) Foreign Application Priority Data
Mar. 28, 2014 (JP) .................. 2014-069787

(51) Int. Cl.
| | |
|---|---|
| G09G 5/00 | (2006.01) |
| G05F 1/56 | (2006.01) |
| G09G 3/36 | (2006.01) |
| H02M 1/36 | (2007.01) |
| G09G 3/20 | (2006.01) |
| H02M 1/00 | (2006.01) |

(52) U.S. Cl.
CPC .......... G05F 1/56 (2013.01); G09G 3/20 (2013.01); G09G 3/36 (2013.01); H02M 1/36 (2013.01); G09G 2310/0289 (2013.01); G09G 2330/02 (2013.01); G09G 2330/026 (2013.01); H02M 2001/0006 (2013.01)

(58) Field of Classification Search
CPC .......... G09G 3/3696; G09G 2300/021; G09G 3/3655; G09G 2300/02; G09G 3/3688; G09G 3/3611; G09G 3/36; G09G 2310/0245; G09G 2310/0278; G09G 2330/028; G09G 3/3677; G09G 2310/0248; G09G 2310/027; G09G 2320/043; G09G 2330/026; G09G 2330/045; H02M 2001/0003; H02M 2001/0041; H02M 2007/2195; H02M 3/33507; H02M 3/3385
USPC ............... 345/204, 211, 212, 690, 98–100
See application file for complete search history.

(56) References Cited

U.S. PATENT DOCUMENTS

| | | | | |
|---|---|---|---|---|
| 6,323,851 | B1 * | 11/2001 | Nakanishi | G09G 3/3696 345/204 |
| 6,963,323 | B2 * | 11/2005 | Sakurai | G09G 3/3696 345/89 |
| 8,619,444 | B2 * | 12/2013 | Kawasoe | G09G 3/3696 307/109 |

FOREIGN PATENT DOCUMENTS

JP    H08185240    7/1996

* cited by examiner

*Primary Examiner* — Duc Dinh
(74) *Attorney, Agent, or Firm* — Volentine & Whitt, PLLC (57) ABSTRACT

A voltage booster circuit includes a reference voltage generation circuit that generates a first potential and supplies the first potential to a first potential line; a booster section that supplies a second potential to a second potential line, the second potential being boosted from the first potential; a booster control section, connected to the second potential line, that controls the booster section in accordance with the second potential; a switch connected to the first potential line and the second potential line; and a control circuit that controls the switch in accordance with a potential difference between the first potential and the second potential.

11 Claims, 8 Drawing Sheets

VOLTAGE BOOSTER CIRCUIT, SEMICONDUCTOR DEVICE, AND VOLTAGE BOOSTER CIRCUIT CONTROL METHOD

CROSS-REFERENCE TO RELATED APPLICATION

This application claims priority under 35 USC 119 from Japanese Patent Application No. 2014-069787, filed on Mar. 28, 2014, the disclosure of which is incorporated by reference herein.

BACKGROUND OF THE INVENTION

Field of the Invention

The present invention relates to a voltage booster circuit, a semiconductor device, and a voltage booster circuit control method.

Description of the Related Art

A voltage booster circuit that boosts and outputs the potential of a predetermined voltage such as a reference voltage or the like is commonly known. In a voltage booster circuit, the boosting of the predetermined voltage is implemented in accordance with a control signal supplied by a booster control circuit (for example, a clock signal or the like). In some cases, the booster control circuit uses a boosted voltage that has been boosted by the voltage booster circuit as a power supply.

This kind of booster control circuit may not start up properly when a power supply to the voltage booster circuit is turned ON.

For example, just after start-up begins when the power supply to the voltage booster circuit is turned ON, boosting is not yet being implemented. Therefore, the boosted voltage is at 0 V. Therefore, the power supply to the booster control circuit is at 0 V, and the booster control circuit cannot start up. Because the booster control circuit does not start up, boosting cannot be implemented by the voltage booster circuit.

Technologies for avoiding this situation in a voltage booster circuit are known. For example, Japanese Patent Application Laid-Open (JP-A) No. H08-185240 discloses a technology that supplies a constant potential from a start-up circuit when oscillation begins in an oscillator circuit that uses a voltage boosted by the voltage booster circuit as a power supply and supplies a clock signal to the voltage booster circuit.

As another example, a voltage booster circuit is known (see FIG. 8, voltage booster circuit 100) in which a reference voltage line and a boosted voltage line are connected by a diode. A reference voltage is supplied through the reference line. The boosted voltage line supplies a boosted voltage that serves as a power supply voltage for a booster circuit control section, which is a booster control circuit. In the voltage booster circuit 100, when the power supply is turned ON, the reference voltage supplied to the reference voltage line is supplied through the boosted voltage line to the booster circuit control section and the booster circuit control section starts up in accordance with the supplied power supply voltage.

However, in the conventional voltage booster circuit 100 described above, because the reference voltage is supplied to the boosted voltage line via the diode, the potential of the power supply voltage supplied by the boosted voltage line suffers a voltage drop due to the diode, and the potential is lowered from the potential of the reference voltage by the forward voltage drop VF of the diode. Because of this voltage drop, there may be a malfunction in the boosting by the booster section. For example, if the reference voltage is a low voltage, the potential of the power supply voltage that is supplied may be lowered by the voltage drop to below a voltage required for start-up of the booster circuit control section, and the booster circuit control section may not start up. As a result, the booster section may not start up.

SUMMARY OF THE INVENTION

The present invention provides a voltage booster circuit, a semiconductor device and a voltage booster circuit control method that may suppress malfunctions in start-up of a booster section.

A first aspect of the present invention is a voltage booster circuit including: a reference voltage generation circuit that generates a first potential and supplies the first potential to a first potential line; a booster section that supplies a second potential to a second potential line, the second potential being boosted from the first potential; a booster control section, connected to the second potential line, that controls the booster section in accordance with the second potential; a switch connected to the first potential line and the second potential line; and a control circuit that controls the switch in accordance with a potential difference between the first potential and the second potential.

A second aspect of the present invention is a semiconductor device including: a voltage booster circuit according to the first aspect of the present invention that outputs the second potential boosted by the booster section as a driving potential; and a driving circuit that supplies the driving potential to pixels of a liquid crystal display device in accordance with display data to be displayed by the liquid crystal display device.

A third aspect of the present invention is a voltage booster circuit control method including: generating, by a reference voltage generation circuit, a first potential and supplying the first potential to a first potential line; supplying, by a booster section, a second potential to a second potential line, the second potential being boosted from the first potential; controlling, by a booster control section which is connected to the second potential line, the booster section in accordance with the second potential; and controlling, by a control circuit, a switch that is connected to the first potential line and the second potential line in accordance with a potential difference between the first potential and the second potential.

According to the above-described aspects of the present invention, a voltage booster circuit, semiconductor device and voltage booster circuit control method that may suppress malfunctions in start-up of a booster section may be provided.

BRIEF DESCRIPTION OF THE DRAWINGS

Exemplary embodiments of the present invention will be described in detail based on the following figures, wherein.

DETAILED DESCRIPTION OF THE INVENTION

First Exemplary Embodiment

Herebelow, a present exemplary embodiment is described in detail, referring to the attached drawings.

Figure 1:
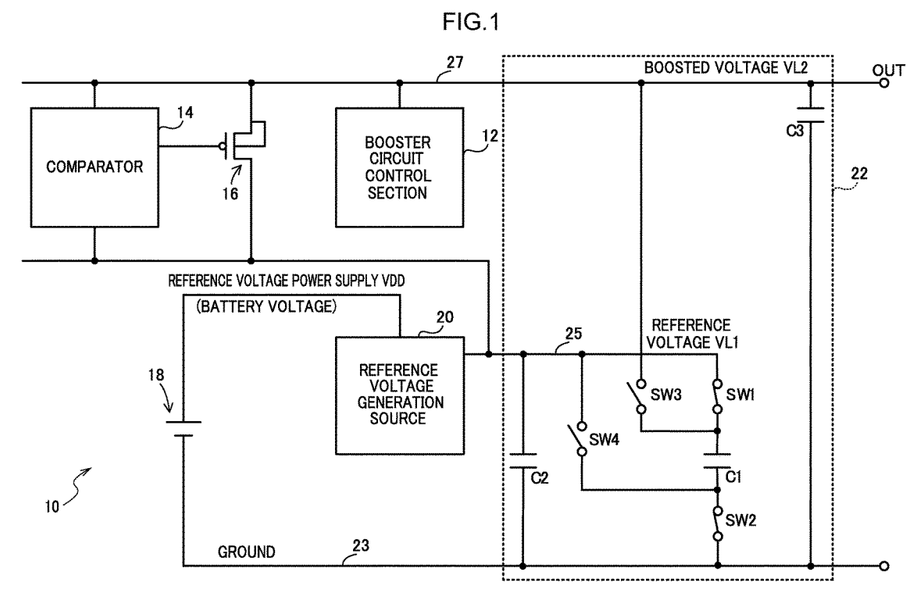
FIG. 1 is a schematic configurational diagram illustrating a voltage booster circuit in accordance with a first exemplary embodiment.

FIG. 1 illustrates a schematic configurational diagram of an example of a voltage booster circuit according to the present exemplary embodiment.

The voltage booster circuit 10 according to the present exemplary embodiment as illustrated in FIG. 1 includes a booster circuit control section 12, a comparator 14, a battery 18, a reference voltage generation source 20 and a booster section 22.

The high potential side of the battery 18 is connected to the reference voltage generation source 20 and the low potential side is connected to a ground line 23 that provides a ground potential. The battery voltage supplied from the battery 18 is used as a power supply for the reference voltage generation source 20 (power supply voltage VDD).

The reference voltage generation source 20 has the function of generating a reference voltage VL1 in accordance with the power supply voltage VDD and supplying the reference voltage VL1 to a reference voltage line 25. The reference voltage VL1 that the reference voltage generation source 20 according to the present exemplary embodiment supplies to the reference voltage line 25 vary due to the effect of the power supply voltage VDD but is not affected by boosting states of the booster section 22.

The booster circuit control section 12 controls boosting operations of the booster section 22 by generating a clock signal and outputting the clock signal to the booster section 22. The booster circuit control section 12 is connected to the boosted voltage line 27. The booster circuit control section 12 operates using a voltage supplied to the boosted voltage line 27 (a boosted voltage VL2) as a power supply voltage.

A switch element 16 controls the voltage supplied to the boosted voltage line 27 (described in detail below). In the voltage booster circuit 10 according to the present exemplary embodiment, a PMOS transistor is used as the switch element 16. One main terminal of the switch element 16 is connected to the boosted voltage line 27, and the other main terminal is connected to the reference voltage line 25.

The comparator 14 is connected to the reference voltage line 25 and the boosted voltage line 27. The comparator 14 has the function (described in detail below) of controlling to turn the switch element 16 ON and OFF in accordance with a voltage difference (a potential difference) between the reference voltage VL1 supplied to the reference voltage line 25 and the boosted voltage VL2 supplied to the boosted voltage line 27.

The booster section 22 includes capacitance elements C1, C2 and C3, and switch elements SW1, SW2, SW3 and SW4. The booster section 22 supplies the boosted voltage VL2, which has been boosted to twice the reference voltage VL1 supplied to the reference voltage line 25, to the boosted voltage line 27. As a specific example, if the reference voltage VL1 is 1.2 V, the boosted voltage VL2 that the booster section 22 supplies to the boosted voltage line 27 is boosted to 2.4 V. The boosted voltage VL2 that has been boosted is outputted to outside the voltage booster circuit 10 through a terminal OUT.

One end of the capacitance element C1 is connected to the reference voltage line 25 via the switch element SW1, and is connected to the boosted voltage line 27 via the switch element SW3. The other end of the capacitance element C1 is connected to the ground line 23 via the switch element SW2, and is connected to the reference voltage line 25 via the switch element SW4. One end of the capacitance element C2 is connected to the reference voltage line 25, and the other end is connected to the ground line 23. One end of the capacitance element C3 is connected to the boosted voltage line 27, and the other end is connected to the ground line 23.

Boosting operations of the voltage booster circuit 10 are described.

First, in response to the clock signal supplied from the booster circuit control section 12, the switch elements SW1 and SW2 of the booster section 22 turn ON and the switch elements SW3 and SW4 turn OFF. In this state, the one end of the capacitance element C1 is connected to the reference voltage line 25 and the other end is connected to the ground line 23. Thus, the capacitance elements C1 and C2 are connected in parallel. Therefore, the reference voltage VL1 accumulates at each of the capacitance elements C1 and C2.

Then, in response to the clock signal supplied from the booster circuit control section 12, the switch elements SW1 and SW2 of the booster section 22 turn OFF and the switch elements SW3 and SW4 turn ON. In this state, the one end of the capacitance element C1 is connected to the boosted voltage line 27 and the other end is connected to the reference voltage line 25. Thus, the capacitance elements C1 and C2 are connected in series. Therefore, the reference voltage VL1 added to the reference voltage VL1 is supplied to the boosted voltage line 27 and is outputted through the terminal OUT.

The booster section 22, by repeating the charging and discharging of the capacitance elements C1 and C2, outputs the boosted voltage VL2 that is boosted to twice the reference voltage VL1 to the outside through the terminal OUT.

As described above, the boosting operation of the booster section 22 is implemented on the basis of the clock signal supplied from the booster circuit control section 12. In order to generate the clock signal, the booster circuit control section 12 requires that the power supply voltage supplied by the boosted voltage line 27 (the boosted voltage VL2) be at least a voltage that is necessary for start-up of the booster circuit control section 12.

However, when the power supply of the voltage booster circuit 10 is turned ON (when the power supply is switched from OFF to ON), because the booster section 22 has not yet begun operations, the boosted voltage VL2 is at 0 V. After start-up of the booster section 22 begins, a predetermined duration is required for the boosted voltage VL2 to reach the potential that is twice the reference voltage VL1. Therefore, the boosted voltage VL2 may be below the reference voltage VL1.

In the voltage booster circuit 10 according to the present exemplary embodiment, at this time, the reference voltage VL1 is supplied to the boosted voltage line 27 by the switch element 16. Thus, the voltage required for start-up of the booster circuit control section 12 is supplied. ON/OFF control of the switch element 16 is controlled by the comparator 14.

Figure 2:
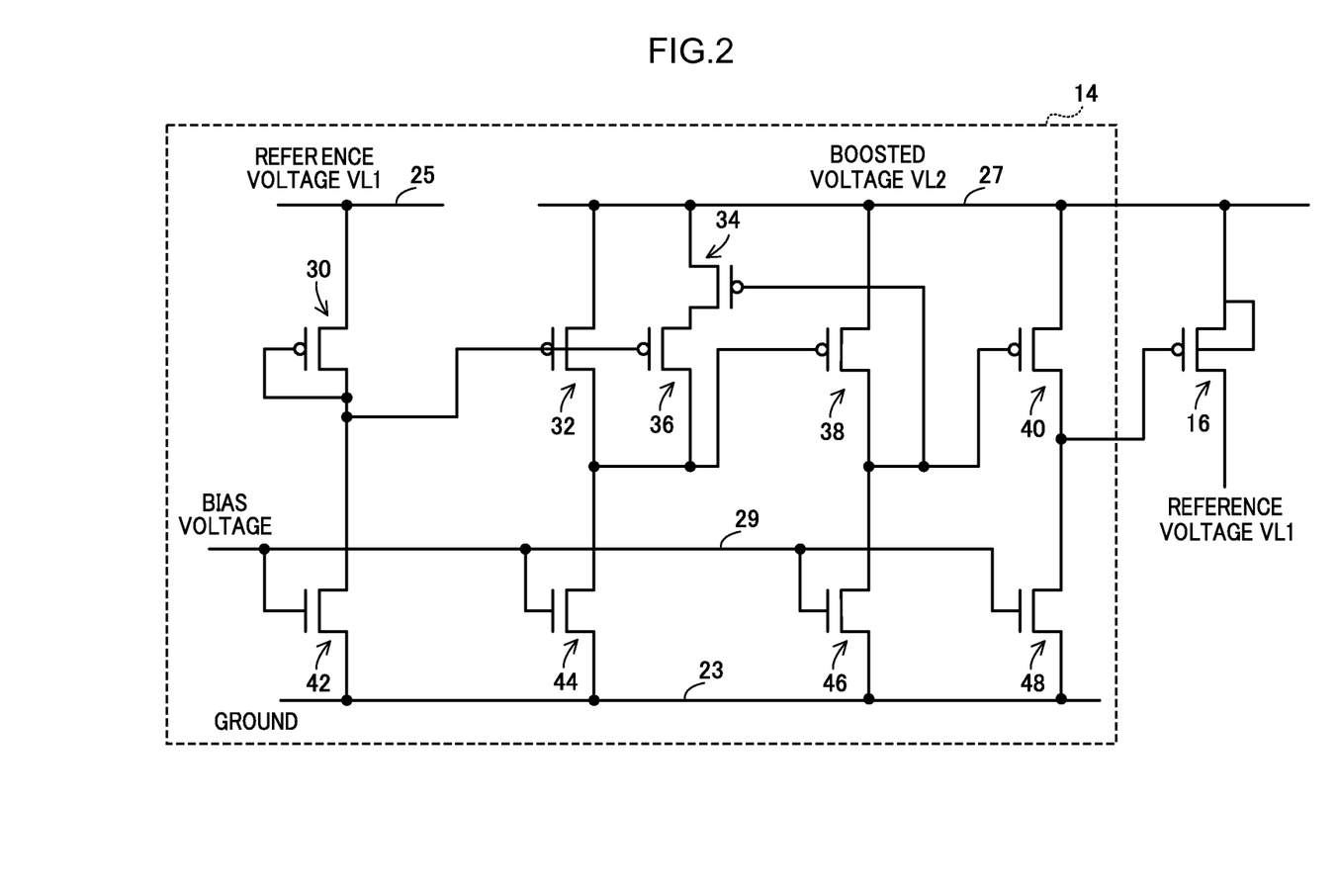
FIG. 2 is a circuit diagram illustrating a comparator in accordance with the first exemplary embodiment.

FIG. 2 illustrates a circuit diagram of an example of the comparator 14 according to the present exemplary embodiment.

The comparator 14 includes PMOS transistors 30, 32, 34, 36, 38 and 40 and NMOS transistors 42, 44, 46 and 48.

One main terminal of the PMOS transistor 30 is connected to the reference voltage line 25 and the other main terminal is connected to the NMOS transistor 42, and the control terminal of the PMOS transistor 30 is connected to the other main terminal thereof. One main terminal of the PMOS transistor 32 is connected to the boosted voltage line 27 and the other main terminal is connected to the NMOS transistor 44, and the control terminal of the PMOS transistor 32 is connected to the other main terminal of the PMOS transistor 30. In the comparator 14 according to the present exemplary embodiment, dimensions of the PMOS transistor 30 (the size of the transistor: the gate width and the gate length ratio) are larger than the dimensions of the PMOS transistor 32.

One main terminal of the PMOS transistor 38 is connected to the boosted voltage line 27 and the other main terminal is connected to the NMOS transistor 46, and the control terminal of the PMOS transistor 38 is connected to the other main terminal of the PMOS transistor 32 and to the other main terminal of the PMOS transistor 36. One main terminal of the PMOS transistor 40 is connected to the boosted voltage line 27 and the other main terminal is connected to the NMOS transistor 48, and the control terminal of the PMOS transistor 40 is connected to the other main terminal of the PMOS transistor 38.

One main terminal of the PMOS transistor 34 is connected to the boosted voltage line 27 and the other main terminal is connected to the PMOS transistor 36, and the control terminal of the PMOS transistor 34 is connected to the other main terminal of the PMOS transistor 38. One main terminal of the PMOS transistor 36 is connected to the other main terminal of the PMOS transistor 34, the other main terminal of the PMOS transistor 36 is connected to the other main terminal of the PMOS transistor 32, and the control terminal of the PMOS transistor 36 is connected to the other main terminal of the PMOS transistor 30.

One main terminal of the NMOS transistor 42 is connected to the PMOS transistor 30 and the other main terminal is connected to the ground line 23. One main terminal of the NMOS transistor 44 is connected to the PMOS transistor 32 and the other main terminal is connected to the ground line 23. One main terminal of the NMOS transistor 46 is connected to the PMOS transistor 38 and the other main terminal is connected to the ground line 23. One main terminal of the NMOS transistor 48 is connected to the PMOS transistor 40 and the other main terminal is connected to the ground line 23. The control terminals of the NMOS transistors 42, 44, 46 and 48 are connected to a bias line 29 to which a bias voltage is supplied. Thus, the bias voltage is supplied to the NMOS transistors 42, 44, 46 and 48 as gate voltages.

Figure 3:
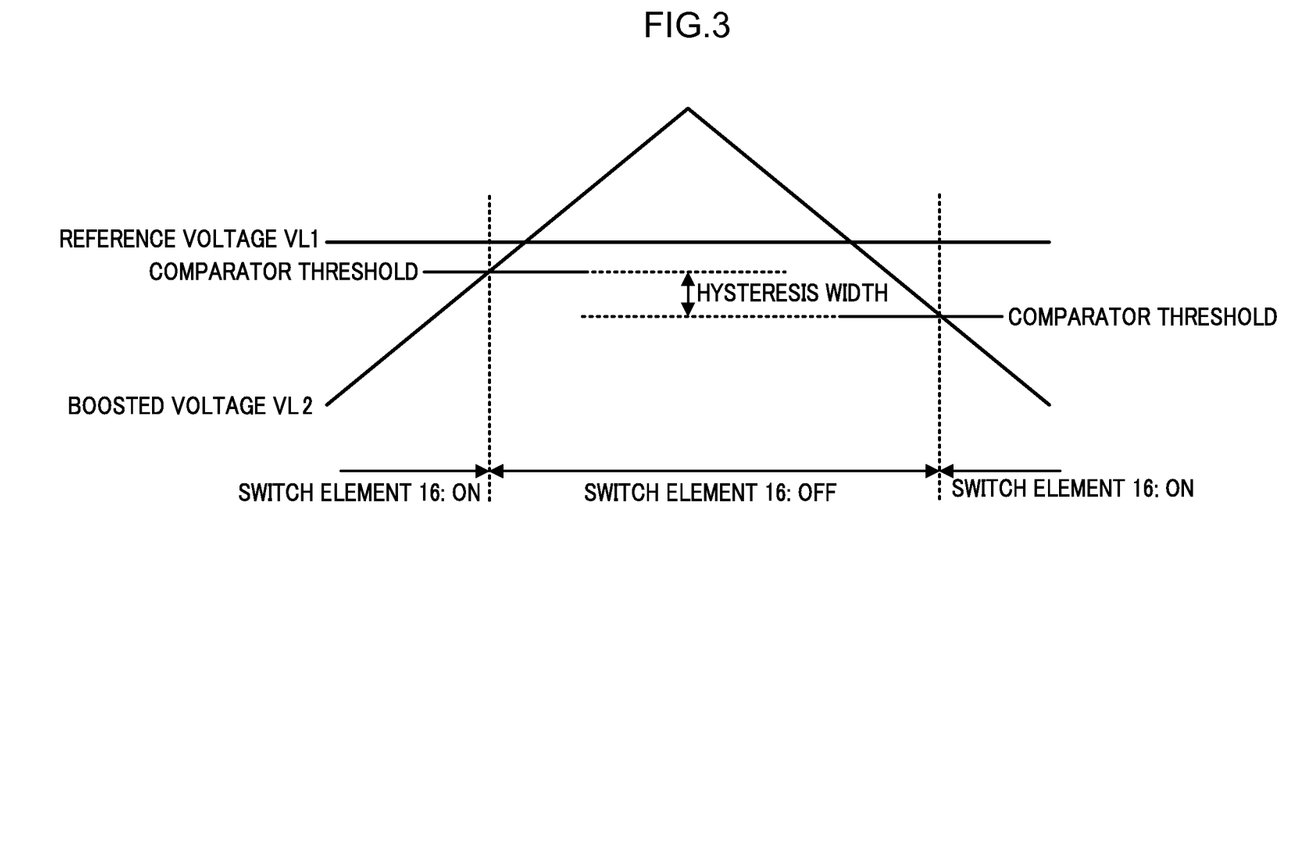
FIG. 3 is a descriptive diagram for describing relationships between a reference voltage VL1, a boosted voltage VL2, a threshold voltage of a comparator, and ON/OFF switching of a switch element in the voltage booster circuit in accordance with the first exemplary embodiment.

FIG. 3 illustrates a descriptive diagram for describing relationships between the reference voltage VL1, the boosted voltage VL2, a threshold voltage of the comparator 14, and on/off switching of the switch element 16 in the voltage booster circuit 10.

Regardless of the potential of the boosted voltage VL2, the NMOS transistors 42, 44, 46 and 48 are turned ON by the bias voltage supplied through the bias line 29.

When the boosted voltage VL2 is at a low potential (for example, 0 V when the power supply is turned on), the reference voltage VL1 is at a higher potential. Therefore, as illustrated in FIG. 3, the boosted voltage VL2 is below the threshold voltage of the comparator 14. Thus, the comparator 14 supplies a low-level potential (0 V) to the control terminal of the switch element 16 as a gate voltage. Therefore, the switch element 16 is turned ON.

When the switch element 16 is in the ON state, the reference voltage line 25 and the boosted voltage line 27 are connected together, and the reference voltage VL1 is supplied from the reference voltage line 25 to the boosted voltage line 27. Thus, in the booster circuit control section 12, the reference voltage VL1 is supplied via the boosted voltage line 27 to serve as the power supply voltage. The booster circuit control section 12 starts up in accordance with the reference voltage VL1. In response to the start-up of the booster circuit control section 12, the booster section 22 starts up, and the potential of the boosted voltage VL2 supplied to the boosted voltage line 27 rises. Specifically, the potential of the boosted voltage VL2 rises from 0 V to the potential that is twice the reference voltage VL1.

When the potential of the boosted voltage VL2 rises and approaches the potential of the reference voltage VL1, as illustrated in FIG. 3, the boosted voltage VL2 goes above the threshold voltage of the comparator 14.

A low-level potential is supplied to the control terminals of the PMOS transistor 32 and the PMOS transistor 36 by the PMOS transistor 30, and the PMOS transistors 32 and 36 turn ON. A high-level potential is supplied to the control terminal of the PMOS transistor 38, and the PMOS transistor 38 turns OFF. A low-level potential is supplied to the control terminals of the PMOS transistors 34 and 40, and the PMOS transistors 34 and 40 turn ON.

Therefore, a potential at a high level (the reference voltage VL1) is supplied to the control terminal of the switch element 16, and the switch element 16 is turned OFF. When the switch element 16 is in the OFF state, the reference voltage line 25 and the boosted voltage line 27 are disconnected from one another. Thus, the supply of the reference voltage VL1 from the reference voltage line 25 to the boosted voltage line 27 is stopped. The potential of the boosted voltage VL2 that is already being supplied to the boosted voltage line 27 by the booster section 22 is a sufficiently high potential. Therefore, the booster circuit control section 12 operates without malfunctions.

Second Exemplary Embodiment

The overall configuration of the voltage booster circuit 10 according to the present exemplary embodiment is the same as the configuration of the voltage booster circuit 10 according to the first exemplary embodiment (FIG. 1). Accordingly, the overall configuration of the voltage booster circuit 10 is not described. The voltage booster circuit 10 according to the present exemplary embodiment differs from the first exemplary embodiment in the configuration of the comparator. Therefore, the configuration of the comparator according to the present exemplary embodiment is described.

Figure 5:
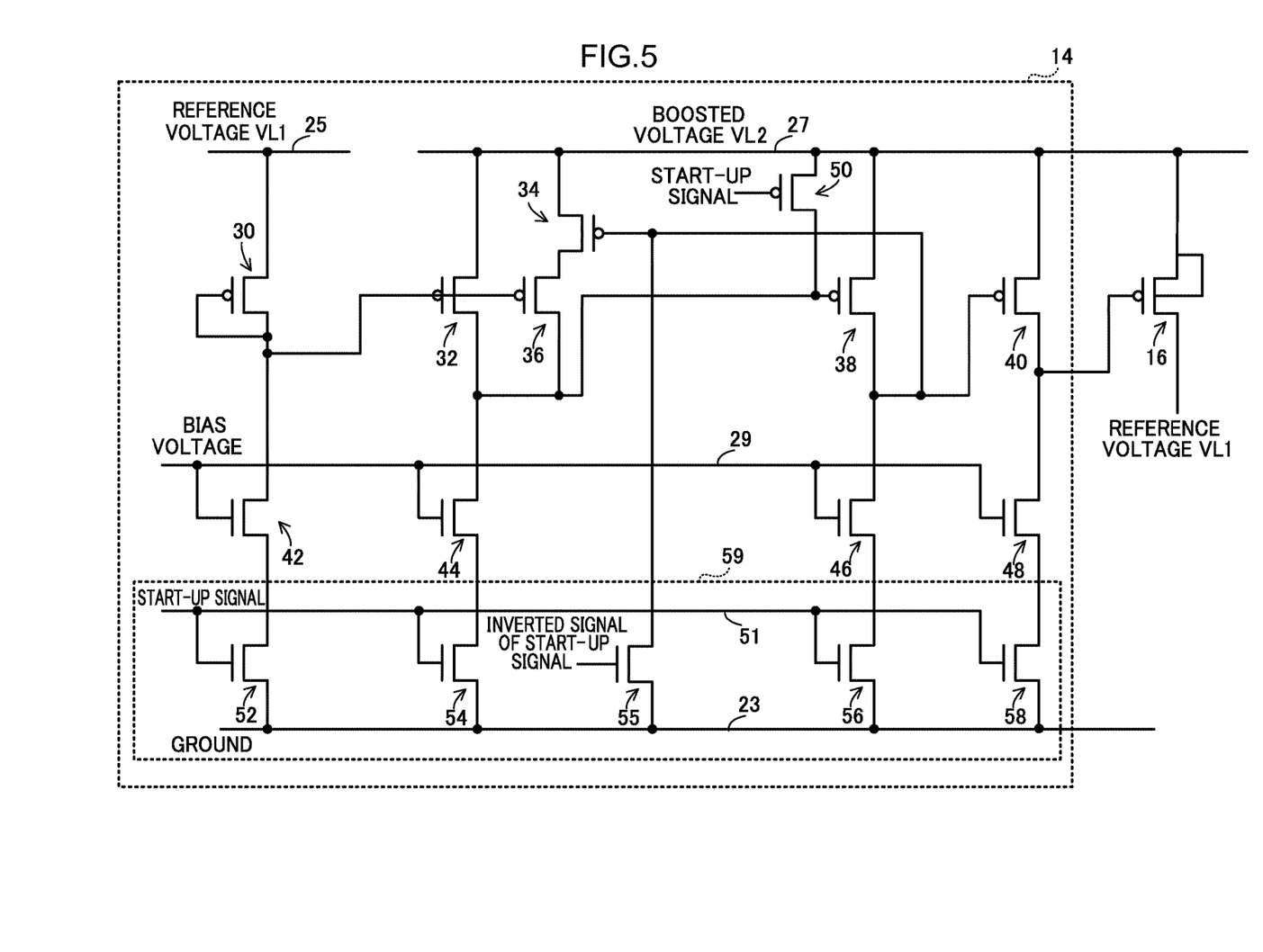
FIG. 5 is a circuit diagram illustrating a comparator in accordance with a second exemplary embodiment.

FIG. 5 illustrates a circuit diagram of an example of the comparator according to the present exemplary embodiment.

A comparator 14 illustrated in FIG. 5 differs from the comparator 14 according to the first exemplary embodiment (see FIG. 2) in being provided with a current supply section 59.

The current supply section 59 is provided between the NMOS transistors 42, 44, 46 and 48 and the ground line 23. The current supply section 59 has the function of disconnecting the NMOS transistors 42, 44, 46 and 48 from the ground line 23 in accordance with a start-up signal.

The current supply section 59 includes NMOS transistors 52, 54, 55, 56 and 58. One main terminal of the NMOS transistor 52 is connected to the NMOS transistor 42 and the other main terminal is connected to the ground line 23. One main terminal of the NMOS transistor 54 is connected to the NMOS transistor 44 and the other main terminal is connected to the ground line 23. One main terminal of the NMOS transistor 56 is connected to the NMOS transistor 46 and the other main terminal is connected to the ground line 23. One main terminal of the NMOS transistor 58 is connected to the NMOS transistor 48 and the other main terminal is connected to the ground line 23. The control terminals of the NMOS transistors 52, 54, 56 and 58 are connected to a start-up line 51 through which the start-up signal is supplied. Thus, the potential of the start-up signal is applied to the NMOS transistors 52, 54, 56 and 58 as gate voltages. One main terminal of the NMOS transistor 55 is connected to the control terminals of the PMOS transistor 34 and the PMOS transistor 40, and the other main terminal of the NMOS transistor 55 is connected to the ground line 23. An inverted signal of the start-up signal is supplied to the control terminal of the NMOS transistor 55. Therefore, the NMOS transistors 52, 54, 56 and 58 turn ON and OFF in opposition to the NMOS transistor 55.

The comparator 14 according to the present exemplary embodiment includes a PMOS transistor 50, of which one main terminal is connected to the boosted voltage line 27 and the other main terminal is connected to the control terminal of the PMOS transistor 38. The start-up signal is supplied to the control terminal of the PMOS transistor 50.

The start-up signal is at a high level in a period (hereinafter referred to as a start-up period) from when the power supply to the voltage booster circuit 10 is turned ON, when the voltage booster circuit 10 itself starts up or the like until the potential of the boosted voltage VL2 goes above the potential of the reference voltage VL1 or the potential of the boosted voltage VL2 goes above the threshold of the comparator 14. In other periods the start-up signal is at a low level. The start-up signal is a signal that is supplied from outside the comparator 14 (or from outside the voltage booster circuit 10), not illustrated in the drawings.

In the start-up period, in which the start-up signal is at the high level, the NMOS transistors 52, 54, 56 and 58 are turned ON and the NMOS transistor 55 is turned OFF. In the other periods, in which the start-up signal is at the low level, the NMOS transistors 52, 54, 56 and 58 are turned OFF and the NMOS transistor 55 is turned ON.

That is, in the other periods, the NMOS transistors 42, 44, 46 and 48, and thus the PMOS transistors 30, 32, 38 and 40 are cut off from the ground line 23 by the current supply section 59.

In the comparator 14 according to the present exemplary embodiment, the PMOS transistor 50 is turned OFF in the start-up period and is turned ON in the other periods. In the other periods, the boosted voltage VL2 at a high level is supplied to the control terminal of the PMOS transistor 38. Thus, the PMOS transistor 38 is turned OFF. Further, in the other periods, the control terminals of the PMOS transistor 34 and the PMOS transistor 40 are connected to the ground line 23 by the NMOS transistor 55 of the current supply section 59. Thus, in the comparator 14 according to the present exemplary embodiment, the potential supplied to the control terminal of the PMOS transistor 40 is controlled in accordance with the start-up signal.

Therefore, in the comparator 14 according to the present exemplary embodiment, in the start-up period currents flow in the comparator 14 and the comparator 14 operates, and in the other periods current paths in the comparator 14 are cut off and operations of the comparator 14 stop. Therefore, in the comparator 14 according to the present exemplary embodiment, current consumption may be suppressed in the other periods.

Third Exemplary Embodiment

Figure 6:
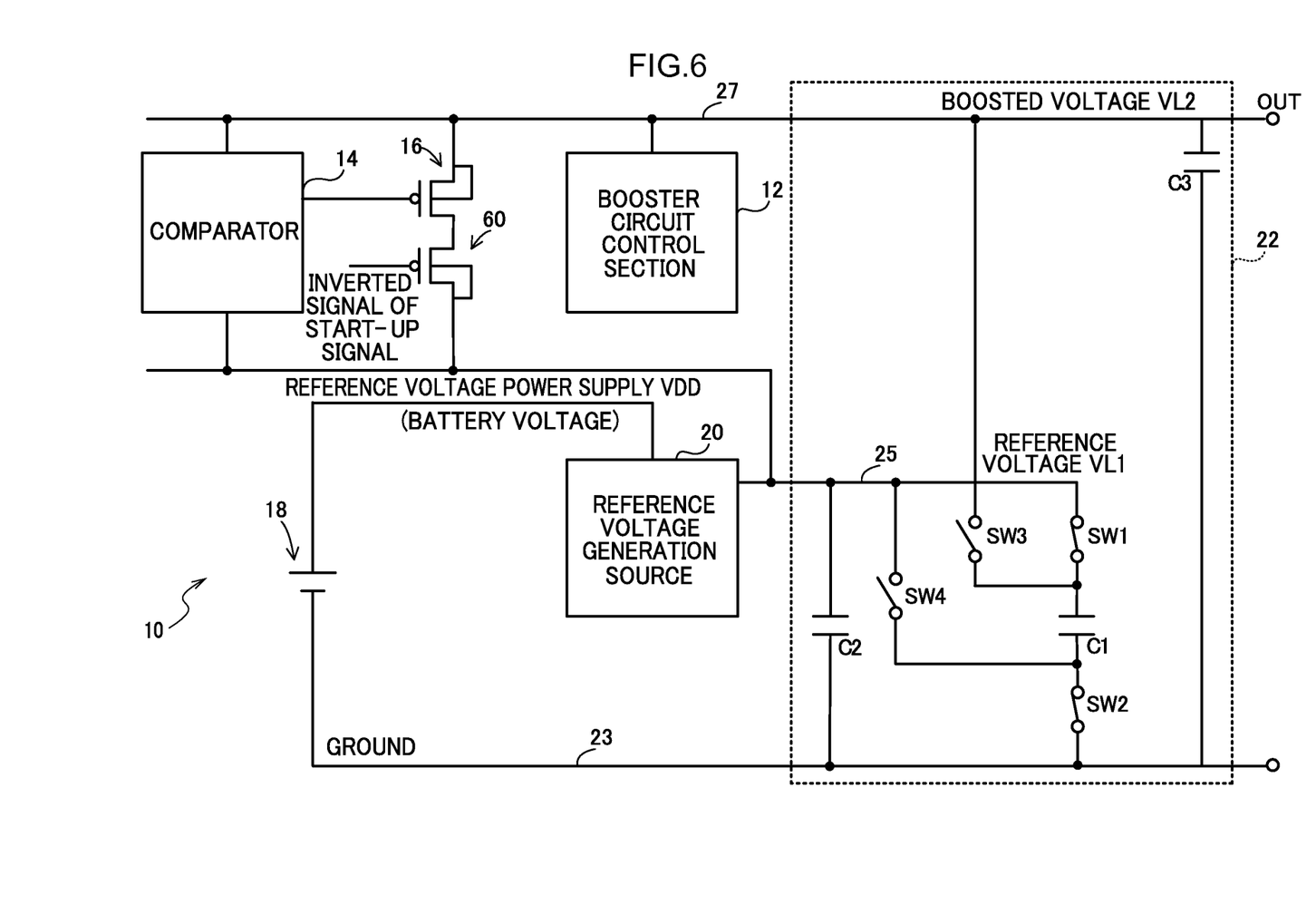
FIG. 6 is a schematic configurational diagram illustrating a voltage booster circuit in accordance with a third exemplary embodiment.

FIG. 6 illustrates a schematic configurational diagram of an example of a voltage booster circuit according to the present exemplary embodiment.

As illustrated in FIG. 6, the voltage booster circuit 10 according to the present exemplary embodiment has the same configuration as the voltage booster circuit 10 according to the first exemplary embodiment (FIG. 1), except that a switch element 60 is provided between the switch element 16 and the reference voltage line 25. Note that the comparator 14 has the same configuration as the comparator 14 according to the second exemplary embodiment (see FIG. 5).

One main terminal of the switch element 60 is connected to the switch element 16 and another main terminal is connected to the reference voltage line 25. An inverted signal of the start-up signal is supplied to a control terminal of the switch element 60. In the voltage booster circuit 10 according to the present exemplary embodiment, the start-up signal, which is supplied to the control terminal of the switch element 60, is the same as the start-up signal according to the second exemplary embodiment.

Therefore, the switch element 60 is turned ON in the start-up period and the switch element 60 is turned OFF in the other periods.

Thus, the reference voltage line 25 and the boosted voltage line 27 may be put into a disconnected state in the other periods.

For example, when the potential of the reference voltage VL1 is higher than the potential of the boosted voltage VL2 outside the start-up period, supply of a voltage higher than the converging voltages of the voltage booster circuit 10 (the booster section 22) to the reference voltage line 25 by the switch element 16 may be suppressed. Moreover, at a time of stopping of the voltage booster circuit 10, supply of the reference voltage VL1 from the reference voltage line 25 to the boosted voltage line 27 by the switch element 16 may be suppressed.

As described hereabove, in the voltage booster circuit 10 according to the above exemplary embodiments, the switch element 16 is provided between the reference voltage line 25 and the boosted voltage line 27, and the control terminal of the switch element 16 is connected to the output of the comparator 14. The comparator 14 controls to turn the switch element 16 ON and OFF in accordance with a potential difference between the potential of the reference voltage VL1 that is supplied to the reference voltage line 25 and the potential of the boosted voltage VL2 that is supplied to the boosted voltage line 27. In the voltage booster circuit 10, when the power supply of the voltage booster circuit 10 is turned ON or the like, the boosted voltage VL2 is at a lower potential than the reference voltage VL1. Thus, when the boosted voltage VL2 is lower than the threshold voltage of the comparator 14, the switch element 16 is in the ON state and the reference voltage VL1 is supplied to the boosted voltage line 27. On the other hand, when the potential of the boosted voltage VL2 is at or above the potential of the reference voltage VL1 and is at or above the threshold voltage of the comparator 14, the switch element 16 is in the OFF state and the supply of the boosted voltage VL2 to the boosted voltage line 27 is stopped.

In the comparator 14 according to the exemplary embodiments described above, the dimensions of the PMOS transistor 32 (the size of the transistor: the gate width and the gate length ratio) are made larger than the dimensions of the PMOS transistor 30. Thus, the switch element 16 may turn OFF before the potential of the boosted voltage VL2 exceeds the potential of the reference voltage VL1. That is, as illustrated in FIG. 3, the threshold voltage of the comparator 14 may be made to be a lower potential than the reference voltage VL1. Thus, according to the comparator 14, reverse currents from the boosted voltage line 27 to the reference voltage line 25 may be suppressed.

In the exemplary embodiments described above, the threshold of the comparator 14 when the potential of the boosted voltage VL2 is rising is affected by the PMOS transistor 36, and the threshold of the comparator 14 when the potential of the boosted voltage VL2 is falling is affected by the PMOS transistor 34. Therefore, as illustrated in FIG. 3, the threshold of the comparator 14 when the potential of the boosted voltage VL2 is rising is a higher potential, and the comparator 14 features the hysteresis width illustrated in FIG. 3. Thus, chattering of the comparator 14 may be suppressed. Furthermore, because the comparator 14 has hysteresis, the time when the switch element 16 turns OFF may be advanced and the time when the switch element 16 turns ON may be delayed. Therefore, reverse currents from the boosted voltage line 27 to the reference voltage line 25 may be suppressed.

Because the bulk of the switch element 16 is connected to the boosted voltage line 27, the effect is as if a diode were formed from the reference voltage line 25 toward the boosted voltage line 27. Therefore, even if the boosted voltage VL2 is at a low potential and is in an unstable state, current may be supplied.

In the exemplary embodiments described above, the bias voltage supplied by the bias line 29 is supplied from a stable power supply to the NMOS transistors 42, 44, 46 and 48. Therefore, even when the boosted voltage VL2 is at a low potential, because the NMOS transistor 48 is stably turned ON, the potential supplied to the control terminal of the switch element 16 may be forcibly set to a low level and the switch element 16 may be kept turned ON.

Figure 8:
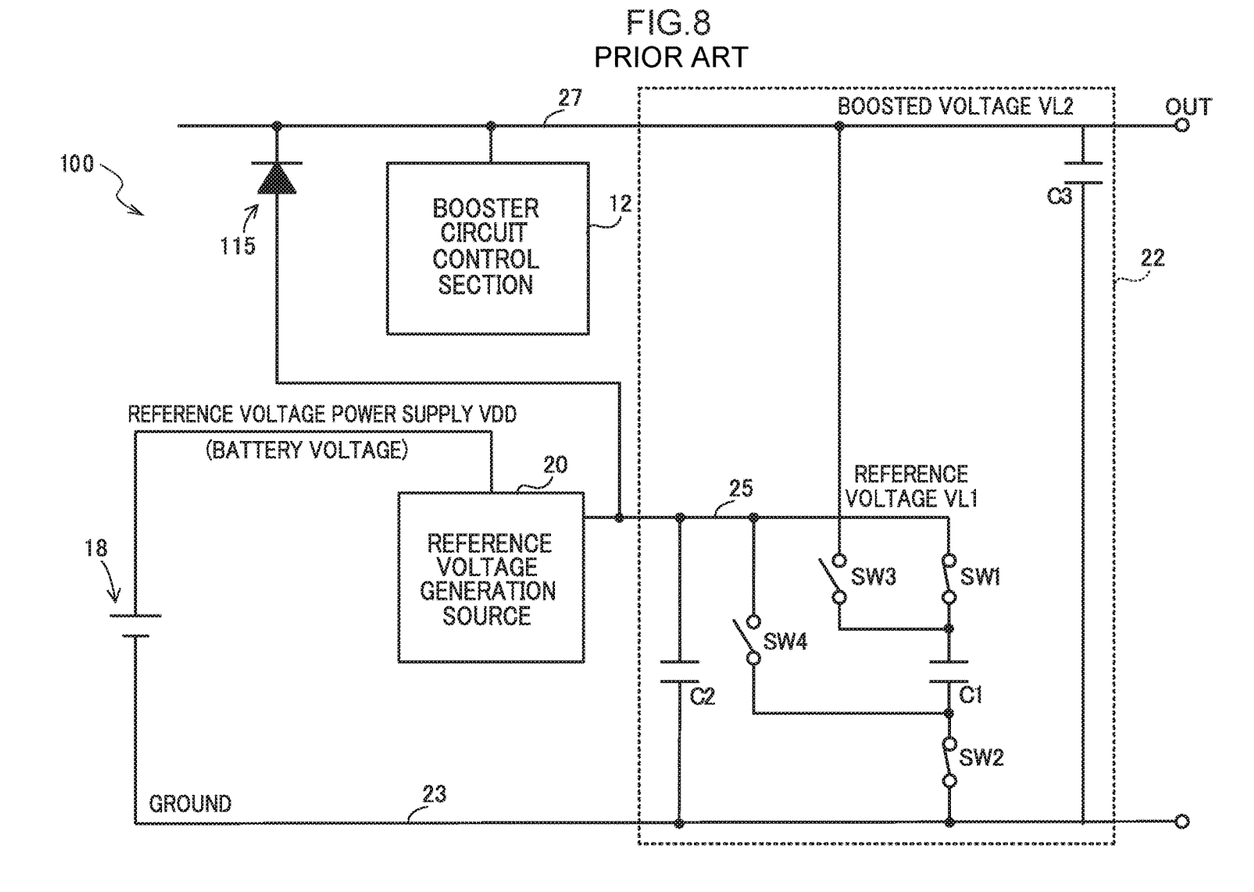
FIG. 8 is a schematic configurational diagram illustrating an example of a conventional voltage booster circuit.

As a comparative example, the conventional voltage booster circuit 100 is described. FIG. 8 illustrates a schematic configurational diagram of an example of the conventional voltage booster circuit 100. In the conventional voltage booster circuit 100, as illustrated in FIG. 8, a diode 115 is provided in place of the comparator 14 and switch element 16 of the voltage booster circuit 10 according to the above exemplary embodiments. The anode of the diode 115 is connected to the reference voltage line 25 and the cathode is connected to the boosted voltage line 27. Thus, when the potential of the reference voltage VL1 that is supplied to the reference voltage line 25 is higher than the potential of the boosted voltage VL2 that is supplied to the boosted voltage line 27, the reference voltage VL1 is supplied to the boosted voltage line 27 through the diode 115. In this case, because of the forward voltage drop VF of the diode 115, the potential supplied to the boosted voltage line 27 is actually the potential of the reference voltage VL1 minus the forward voltage drop VF.

In contrast, in the voltage booster circuit 10 according to the above exemplary embodiments, because the reference voltage VL1 is supplied from the reference voltage line 25 to the boosted voltage line 27 via the switch element 16, the potential of the reference voltage VL1 is directly supplied to the boosted voltage line 27 as is, without a voltage drop as in the voltage booster circuit 100 according to the comparative example.

Figure 4:
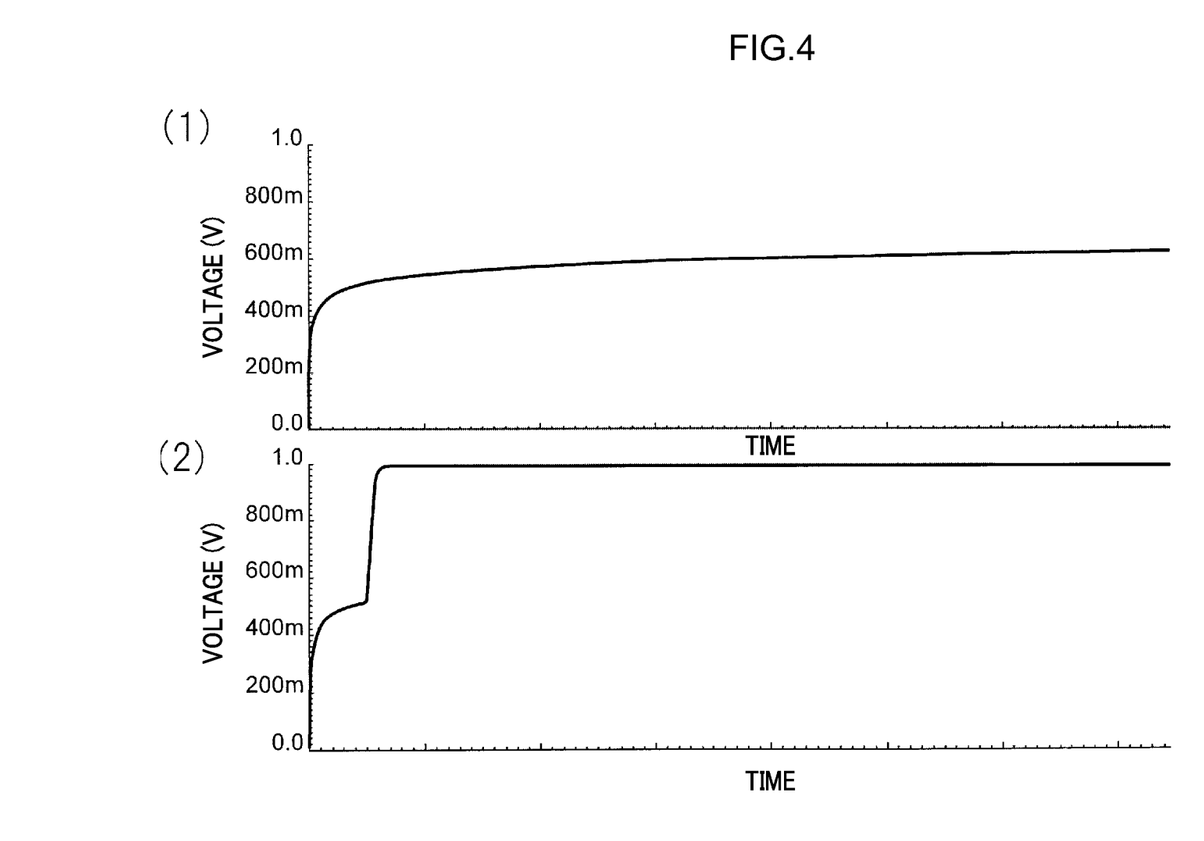
FIG. 4 is a timing chart illustrating a change over time of a waveform of the potential of a boosted voltage line when a power supply of a voltage booster circuit is turned ON, in a case in which the potential of the reference voltage VL1 is 1.0 V.

As a specific example, changes over time of the waveform of the potential of the boosted voltage line 27 when the power supply of the voltage booster circuit 10 is turned ON are illustrated in FIG. 4A and FIG. 4B for cases in which the potential of the reference voltage VL1 is 1.0 V. FIG. 4A illustrates the waveform of the potential of the boosted voltage line 27 in the conventional voltage booster circuit 100, and FIG. 4B illustrates the waveform of the potential of the boosted voltage line 27 in the voltage booster circuit 10 according to the above exemplary embodiments. As illustrated in FIG. 4A, in the conventional voltage booster circuit 100, the potential of the boosted voltage line 27 only rises to 0.65 V, because of the forward voltage drop of the diode 115. In contrast, as illustrated in FIG. 4B, in the voltage booster circuit 10 according to the above exemplary embodiments, the potential of the boosted voltage line 27 quickly rises to close to 1.0 V.

In a case in which, for example, the battery 18 is a single battery and has a low voltage of, as a specific example, around 1.5 V, if the battery 18 deteriorates, "goes flat", the potential of the power supply voltage VDD falls to a low potential of around 1.0 V. In this case, in the conventional voltage booster circuit 100, as illustrated in FIG. 4A, the potential of the boosted voltage line 27 is lower and there is concern that the booster circuit control section 12 may not start up properly. As a result, there may be a malfunction in start-up of the booster section 22.

In contrast, in the voltage booster circuit 10 according to the above exemplary embodiments, as illustrated in FIG. 4B, the potential of the reference voltage VL1 is supplied directly to the boosted voltage line 27 as is. Therefore, the booster circuit control section 12 starts up properly. Thus, malfunctions in start-up of the booster section 22 may be suppressed.

Figure 7:
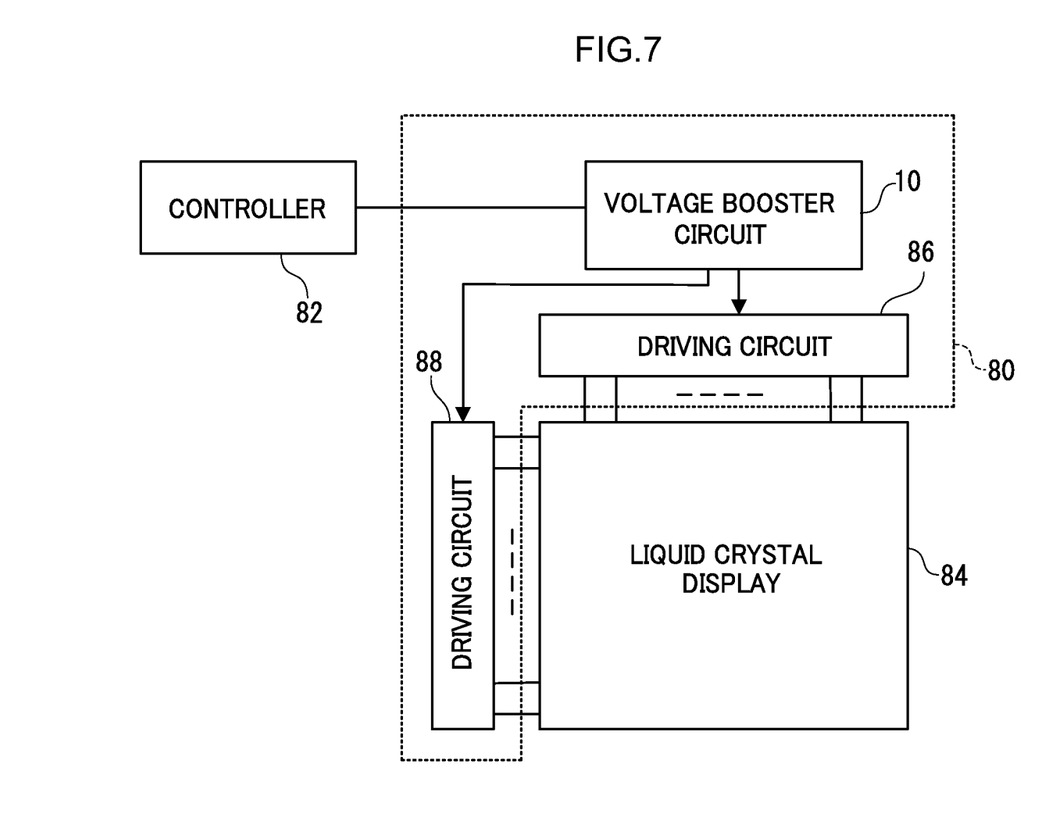
FIG. 7 is a schematic configurational diagram for describing a case in which a voltage booster circuit according to the present invention is employed in an LCD driver.

The boosted voltage VL2 that has been boosted by the voltage booster circuit 10 according to the above exemplary embodiments is supplied to a load circuit outside the voltage booster circuit 10. This load circuit is not particularly limited. For example, this may be applied to a liquid crystal display (LCD) driver of a liquid crystal display device. FIG. 7 illustrates a schematic configurational diagram for describing a case in which the voltage booster circuit 10 according to the above exemplary embodiments is employed in an LCD driver. Driving voltages based on display data are applied to respective pixels of a liquid crystal display 84 by an LCD driver 80. Thus, an image corresponding to the display data is displayed at the liquid crystal display 84. The LCD driver 80 is equipped with the voltage booster circuit 10 and driving circuits 86 and 88. In accordance with instructions from a controller 82, the voltage booster circuit 10 boosts the reference voltage VL1 to generate a driving voltage and supplies the driving voltage to the driving circuits 86 and 88. In accordance with instructions from the controller 82, the driving circuits 86 and 88 apply the driving voltage to corresponding pixels of the liquid crystal display 84. It will be clear that examples of application of the voltage booster circuit 10 are not limited to LCD drivers.

In the exemplary embodiments described above, the comparator 14 and the switch element 16 are connected to the reference voltage line 25, but may be connected to alternative signal lines. In this case, it is sufficient that an initial voltage for starting up the booster circuit control section 12 be supplied to an alternative signal lines.

For the comparator 14 according to the above exemplary embodiments, a case is described in which the PMOS transistors 34 and 36 are provided, but these need not be provided. However, because the PMOS transistors 34 and 36 are provided as described above, the comparator 14 has hysteresis. Therefore, it is preferable to provide the PMOS transistors 34 and 36 as in the comparator 14 according to the above exemplary embodiments.

In the voltage booster circuit 10 according to the above exemplary embodiments, a two-level voltage booster circuit that boosts to twice the potential of the reference voltage VL1 is described. However, this is not limiting; boosting to a voltage at an even higher potential is possible. In this case, it is sufficient to increase the number of capacitance elements in correspondence with each rise in the boosting level and stack the capacitance elements in line with the capacitance element C1. In this case, the boosted voltage VL2 supplied to the boosted voltage line 27 is at a much higher potential.

In other respects, configurations and operations of the voltage booster circuit 10, the comparator 14, the switch element 16 and the like described in the above exemplary embodiments are examples and may be modified in accordance with conditions within a scope that does not deviate from the spirit of the present invention.

What is claimed is:

1. A voltage booster circuit comprising:
   a reference voltage generation circuit that generates a first potential and supplies the first potential to a first potential line;
   a booster section that supplies a second potential to a second potential line, the second potential being boosted from the first potential;
   a booster control section, connected to the second potential line, that controls the booster section in accordance with the second potential;
   a switch connected to the first potential line and the second potential line; and
   a control circuit that controls the switch in accordance with a potential difference between the first potential and the second potential.

2. The voltage booster circuit according to claim 1, wherein the control circuit turns the switch OFF when the second potential is at least the first potential.

3. The voltage booster circuit according to claim 1, wherein the control circuit turns the switch ON when the second potential is less than the first potential.

4. The voltage booster circuit according to claim 1, wherein the control circuit comprises:
   a first PMOS transistor including one main terminal connected to the first potential line, an other main terminal connected to a third potential line to which a predetermined potential that is lower than the first potential is supplied, and a control terminal connected to the other main terminal;
   a second PMOS transistor including one main terminal connected to the second potential line, an other main terminal connected to the third potential line, and a control terminal connected to the other main terminal of the first PMOS transistor;
   a third PMOS transistor including one main terminal connected to the second potential line, an other main terminal connected to the third potential line, and a control terminal connected to the other main terminal of the second PMOS transistor; and
   a fourth PMOS transistor including one main terminal connected to the second potential line, an other main terminal connected to the third potential line, and a control terminal connected to the other main terminal of the third PMOS transistor.

5. The voltage booster circuit according to claim 4, further comprising:
   a first NMOS transistor, provided between the first PMOS transistor and the third potential line, including a control terminal connected to a bias line that supplies a bias voltage;
   a second NMOS transistor, provided between the second PMOS transistor and the third potential line, including a control terminal connected to the bias line;
   a third NMOS transistor, provided between the third PMOS transistor and the third potential line, including a control terminal connected to the bias line; and
   a fourth NMOS transistor, provided between the fourth PMOS transistor and the third potential line, including a control terminal connected to the bias line.

6. The voltage booster circuit according to claim 4, wherein the control circuit further comprises a switching section that switches between connection and disconnection of the third potential line and the respective other main terminals of the first PMOS transistor, the second PMOS transistor, the third PMOS transistor and the fourth PMOS transistor.

7. The voltage booster circuit according to claim 4, wherein the control circuit further comprises:
   a fifth PMOS transistor including one main terminal connected to the second potential line and a control terminal connected to the other main terminal of the third PMOS transistor; and
   a sixth PMOS transistor including one main terminal connected to an other main terminal of the fifth PMOS transistor, an other main terminal connected to the other main terminal of the second PMOS transistor, and a control terminal connected to the other main terminal of the first PMOS transistor.

8. The voltage booster circuit according to claim 1, further comprising a control switch, connected between the first potential line and the switch, that has an ON state in a period from a time when the voltage booster circuit starts up until the second potential is boosted to a predetermined potential by the booster section.

9. The voltage booster circuit according to claim 4, wherein a dimension of the second PMOS transistor is larger than a dimension of the first PMOS transistor.

10. A semiconductor device comprising:
    a voltage booster circuit according to claim 1 that outputs the second potential boosted by the booster section as a driving potential; and
    a driving circuit that supplies the driving potential to pixels of a liquid crystal display device in accordance with display data to be displayed by the liquid crystal display device.

11. A voltage booster circuit control method comprising:
generating, by a reference voltage generation circuit, a first potential and supplying the first potential to a first potential line;
supplying, by a booster section, a second potential to a second potential line, the second potential being boosted from the first potential;
controlling, by a booster control section which is connected to the second potential line, the booster section in accordance with the second potential; and
controlling, by a control circuit, a switch that is connected to the first potential line and the second potential line in accordance with a potential difference between the first potential and the second potential.

* * * * *